United States Patent [19]
Johnson et al.

[11] Patent Number: 5,534,230
[45] Date of Patent: Jul. 9, 1996

[54] SEGMENTED HEAT EXCHANGER FLUE GAS TREATMENT

[75] Inventors: Dennis W. Johnson, Barberton; Karl H. Schulze, North Canton, both of Ohio

[73] Assignee: The Babcock & Wilcox Company, New Orleans, La.

[21] Appl. No.: 270,705

[22] Filed: Jul. 5, 1994

[51] Int. Cl.[6] ........................................ F01N 3/10
[52] U.S. Cl. ........................ 422/173; 55/222; 55/242; 261/153; 422/169; 422/172; 422/200
[58] Field of Search .................................... 422/173, 169, 422/168, 172, 198, 200; 55/222, 257.1, 223, 242; 261/153, 155, 22, 108

[56] References Cited

U.S. PATENT DOCUMENTS

| | | | |
|---|---|---|---|
| 3,638,708 | 2/1972 | Farin | 159/47 WL |
| 3,997,294 | 12/1976 | Kritzler | 55/222 X |
| 4,132,537 | 1/1979 | Bennett | 55/223 X |
| 4,431,617 | 2/1984 | Farin | 423/232 |
| 4,487,139 | 12/1984 | Warner | 110/345 |
| 4,526,112 | 7/1985 | Warner | 110/345 |
| 4,557,202 | 6/1985 | Warner | 110/216 |
| 4,577,380 | 3/1986 | Warner | 29/157.3 |
| 4,669,530 | 6/1987 | Warner | 165/1 |
| 4,681,744 | 7/1987 | Weitman | 422/173 |
| 4,705,101 | 11/1987 | Warner | 165/111 |
| 4,776,391 | 4/1988 | Warner | 165/111 |
| 4,852,344 | 8/1989 | Warner | 60/39.182 |
| 5,344,617 | 9/1994 | Johnson | 422/172 |

OTHER PUBLICATIONS

"Utility Seeks to Integrate Heat Recovery Flue Gas Treatment," *Power*, May 1993.
Rochelle, Gary, "Process Alternates for Stack Gas Desulfurization with Steam Regeneration to Produce SO$_2$," EPA Symp. 1977.
B&W White Paper 1993.

*Primary Examiner*—Robert J. Warden
*Assistant Examiner*—Krisanne M. Thornton
*Attorney, Agent, or Firm*—Daniel S. Kalka; Robert J. Edwards

[57] ABSTRACT

A system for treating a flue gas includes a first condensing heat exchanger located in the housing for removing heat from flue gas as the flue gas is downwardly passed therethrough. A first collection tank is located in the housing below the first heat exchanger for collecting liquid and particulate. A second heat exchanger is located in the housing for condensibly removing pollutants from the flue gas as the flue gas is upwardly passed through the second heat exchanger. A second collection tank is located in the housing below the second heat exchanger for collecting liquid and particulate.

5 Claims, 3 Drawing Sheets

SEGMENTED HEAT EXCHANGER FLUE GAS TREATMENT

BACKGROUND OF THE INVENTION

1. Field of the Invention

The present invention relates, in general, to the treatment of flue gas and, in particular, to a new and useful system and method for recovering useful heat from flue gas while removing particulates, fly ash, sulfur oxides and/or other contaminants contained in the flue gas formed during the combustion of waste materials, coal and other fossil fuels, which are burned by electric power generating plants, waste-to-energy plants and other industrial processes.

2. Description of the Related Art

There are several known systems that are used for the integrated heat recovery and pollutant removal of particulates, sulfur oxides and/or contaminants from a hot combustion exhaust gas in order to comply with government emissions requirements.

FIG. 1 shows one known system which is a condensing heat exchanger, generally designated 2, which recovers both sensible and latent heat from a flue gas 3 in a single unit. The gas 3 passes down through a heat exchanger 4 while water 6 passes upward in a serpentine path through the heat exchanger tubes. Condensation occurs within the heat exchanger 4 as the gas temperature at the tube surface is brought below the dew point. The condensate falls as a constant rain over the tube array and is removed at the bottom of the unit 2. Gas cleaning can occur within the heat exchanger 4 as the particulates impact the tubes and gas condensation occurs.

The heat exchanger tubes and inside surfaces of the heat exchanger shell 4 are made of, or covered with, a corrosion resistant material like TEFLON a registered trademark of Du Pont Co., in order to protect them from corrosion when the flue gas temperature is brought below the acid dew point. Interconnections between the heat exchanger tubes are made outside of the tube sheet and are not exposed to the corrosive flue gas stream 3.

FIG. 2 shows a second system which is an integrated flue gas treatment (IFGT) condensing heat exchanger, generally designated 10, designed to enhance the removal of pollutants from the flue gas stream 3. It is also made of corrosion resistant material or has all of the inside surfaces covered with TEFLON.

There are four major sections of the IFGT 10; a first heat exchanger stage 12, an interstage transition region 14, a second heat exchanger stage 16, and a mist eliminator 18. The major differences between the integrated flue gas treatment design 10 and the conventional condensing heat exchanger design 2 (FIG. 1) are:

1. the integrated flue gas treatment design 10 uses two heat exchanger stages 12 and 16 instead of one;
2. the interstage transition region 14, located between the two heat exchanger stages 12 and 16, is used to direct the gas 3 to the second heat exchanger stage 16, acts as a collection tank, and allows for treatment of the gas 3 between the stages 12 and 16;
3. the gas flow 3 in the second heat exchanger stage 16 is upward, rather than downward;
4. the second heat exchanger stage 16 is equipped with an alkali reagent spray system 20; and
5. the mist eliminator 18 is used to separate the water formed by condensation and entrained from the sprays from the flue gas 3.

Most of the sensible heat and some latent heat is removed from the gas 3 in the first heat exchanger stage 12 of the IFGT 10. The transition region 14 can be equipped with a water or alkali spray system 20. The system 20 saturates the flue gas 3 with moisture before it enters the second heat exchanger stage 16 and also assists in removing sulfur pollutants from the gas 3. The transition section 14 is made of or coated with corrosion resistant material like fiberglass-reinforced plastic. The second heat exchanger stage 16 is operated in the condensing mode, removing latent heat from the gas 3 along with the pollutants. The top of the second heat exchanger stage 16 is equipped with the alkali solution spray system 20. The gas 3 in this stage 16 is flowing upward while the droplets in the gas 3 fall downward. This counter-current gas/droplet flow provides a scrubbing mechanism that enhances particulate and pollutant capture. The condensed gases, particulates, and reacted alkali solution are collected at the bottom of the transition section 14. The flue gas outlet of the IFGT 10 is equipped with the mist eliminator 18 in order to reduce the chance of moisture carryover.

SUMMARY OF THE INVENTION

The present invention is a system and method for treating a flue gas which includes a housing having an inlet and an outlet in which flue gas enters the housing through the inlet and exits the housing through the outlet. A first condensing heat exchanger is located in the housing below the inlet for removing heat from flue gas as the flue gas is downwardly passed in the housing through the first heat exchanger. A first collection tank is located in the housing below the first heat exchanger for collecting liquid and particulate. A second heat exchanger is located in the housing for condensibly removing pollutants from the flue gas as the flue gas is upwardly passed through the second heat exchanger. A second collection tank is located in the housing below the second heat exchanger for also collecting liquid and particulates. A first mist eliminator is located in the housing between the first heat exchanger and the second heat exchanger for removing mist from the flue gas. Liquid spray devices are located near the first heat exchanger and the second heat exchanger for spraying the flue gas with a washing liquid in order to remove soluble pollutants from the flue gas and wash the flue gas of solid pollutants. A reagent slurry spray device is also located in the housing near the second heat exchanger for removing $SO_2$ from the flue gas.

It is an object of the present invention to provide a segmented system for treating a flue gas which is more efficient than other known systems and methods.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
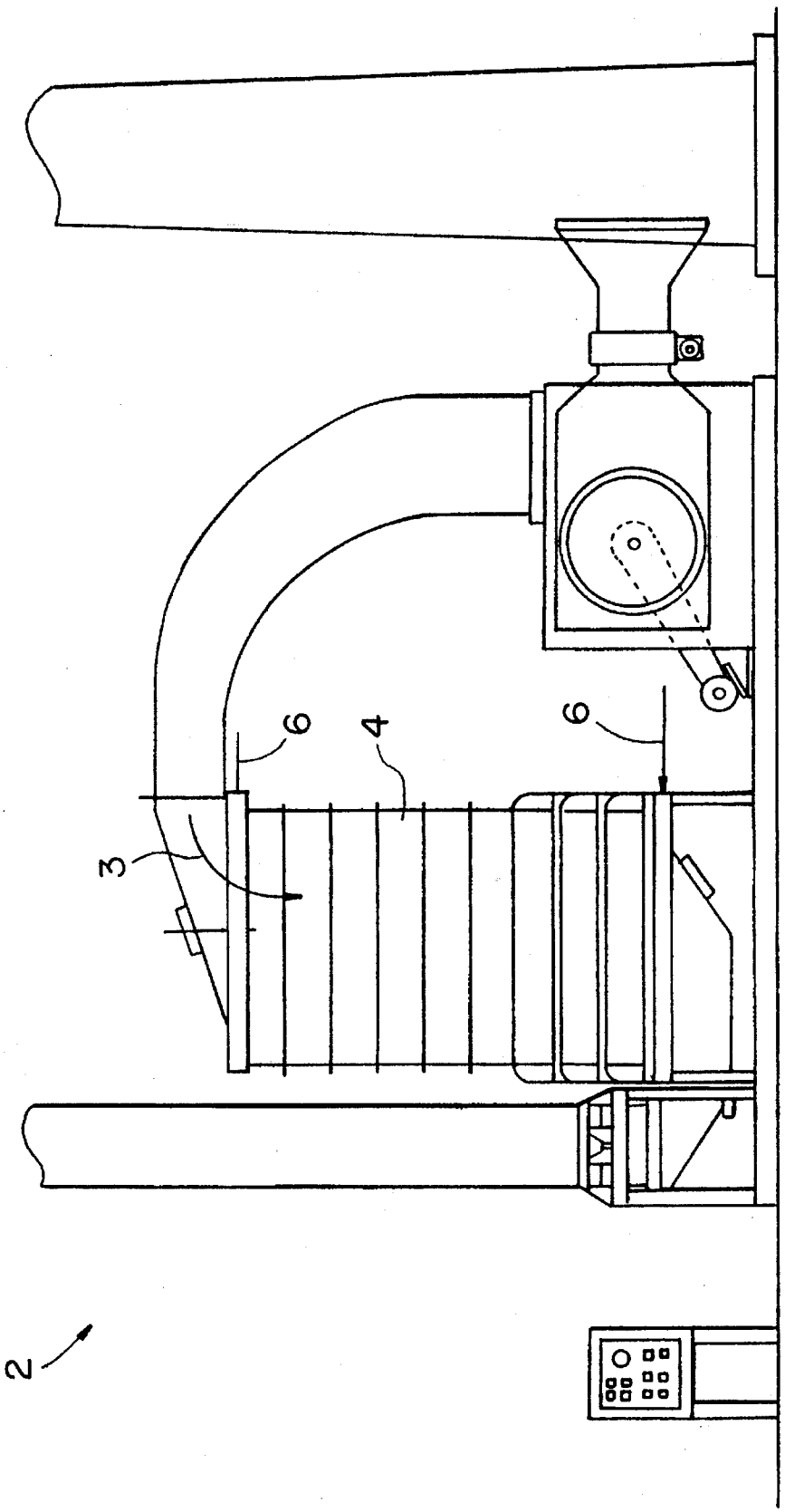
FIG. 1 is a schematic view illustrating a first known flue gas treatment system.
Figure 2:
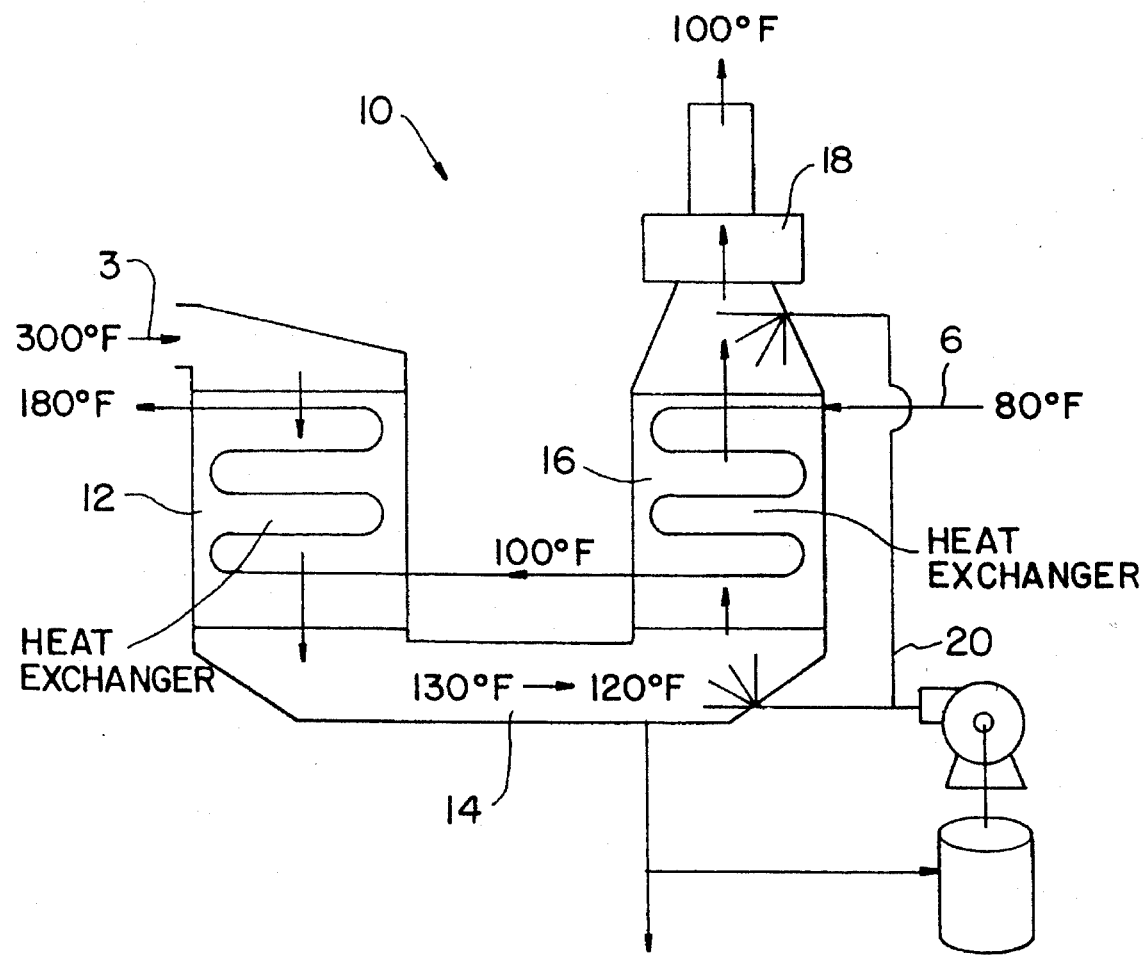
FIG. 2 is a schematic view illustrating a second flue gas treatment system.
Figure 3:
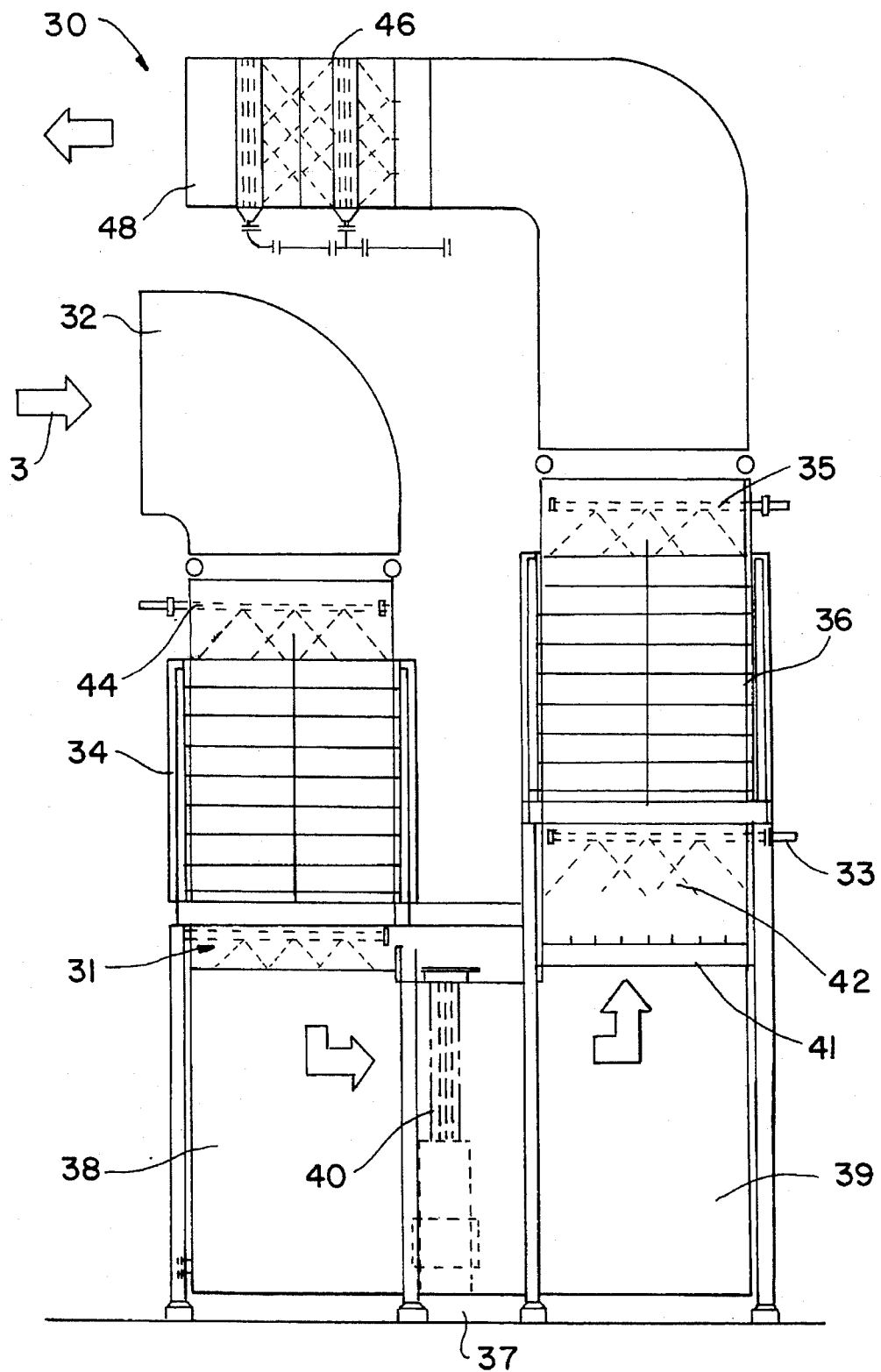
FIG. 3 is a schematic view illustrating a flue gas treatment system according to the present invention.

The present invention is a segmented heat exchanger system, generally designated 30, which is used to treat flue gas 3 using an alkali slurry or solution system 33 as shown in FIG. 3. The purpose of the present invention is to provide improved pollutant removal performance from flue gas 3 over the systems such as the system 2 illustrated in FIG. 1 and the IFGT system 10 shown in FIG. 2.

The present invention comprises two condensing heat exchanger stages 34 and 36 separated by a transition region 37 for housing 30 having inlet 32 and outlet 48. The transition region 37 comprises four sections: a first collection tank 38 beneath the first heat exchanger stage 34, a first mist eliminator 40 between the heat exchangers 34 and 36, a second collection tank 39 beneath the second heat exchanger 36, and a gas/slurry contact region 42 between collection tank 39 and slurry spray device 33. A second mist eliminator 46 is also provided near outlet 48 in order to reduce the chance of moisture carryover to the exhaust stack. An optional spray 31 is used to promote pollutant removal at the first heat exchanger 34. The heat exchanger tubes and internals of the system 30 are made of corrosion resistant material or are covered with such material like TEFLON. The top of the second heat exchanger stage 36 is equipped with an optional spray device 35 that can be used to spray alkali solution in place of the slurry spray system 33, if desired. Spray device 35 can also be used to spray water over the second heat exchanger stage 36 to maintain cleanliness of the heat exchanger and/or enhance particulate removal. An intermittent wash device 44 is provided at the top of heat exchanger 34 in order to wash particulates from the first heat exchanger stage 34 with a washing liquid. The operation of the present invention is described below.

First, flue gas 3 enters at the top of the first heat exchanger stage 34 from inlet 32 of the unit 30 and flows downward through the first heat exchanger 34. The first heat exchanger stage 34 is operated in the condensing mode for removing both sensible and latent heat from the flue gas 3. The droplet formation in the first heat exchanger stage 34 aids in the removal of small particulates and soluble pollutants, such as HF and HCl. The gas 3 then passes through an optional spray device 31 before entering the top of the first collection tank 38. When used, spray 31 will generally be a water spray, recirculated from collection tank 38. However, a reagent may be added to spray device 31 in order to promote removal of air toxic materials. The spray 31 also assists in the removal of particulates and soluble pollutants from the gas 3 and ensures that the gas 3 is saturated before it enters the gas/slurry contact region 42. The gas 3 then passes through the first mist eliminator 40 before entering at the top of the second collection tank 39. The condensate collected from the first mist eliminator 40 is drained back into the first collection tank 38.

The flue gas 3 is directed upward through the optional gas/slurry contact region 42 where the $SO_2$ and other acid gases are removed by slurry spray device 33. This region 42 consists of an alkali slurry spray 33 combined with gas/slurry contact trays 41 or other high surface area contact mechanisms as appropriate. The alkali slurry 33 interacts with the flue gas 3 so that $SO_2$ and other acid gases are removed from the flue gas 3 and the reacted slurry falls downward and is collected in the second collection tank 39. The flue gas 3 continues traveling upward through the second heat exchanger stage 36. The second heat exchanger stage 36 can be operated under subcooled conditions in order to improve the removal efficiency of condensible trace elements, such as mercury and other air toxics, and assist in the removal of any remaining particulate matter. If a soluble reagent, such as a sodium or magnesium based alkali, is used, then the spray device 35 is utilized and operated rather or in addition to the gas/slurry contact region 42.

The top of the first and second heat exchanger stages 34 and 36 are equipped with water spray 44 and 35 which is activated periodically in order to maintain the cleanliness of the system.

There are several major differences between the present invention and the standard IFGT system 10 (FIG. 2) which are listed below as follows:

1. The standard IFGT configuration 10 cannot use an alkali slurry to remove $SO_2$ from the flue gas 3. It must use an alkali solution. The particles in the slurry could erode the TEFLON covering on the tubes and cause premature failure of the heat exchanger. In the segmented design of the present invention, the slurry 33 does not come into contact with the TEFLON covered tubes of heat exchanger 34 and 36 so there is no danger of damaging them.

2. The transition piece 14 in the standard IFGT design 10 is also used as the collection tank. This single tank 14 collects the condensate and reacted alkali solution from both of the heat exchanger stages 12 and 16. In the segmented design of the present invention, however, there are two collection tanks 38 and 39, one below each heat exchanger stage 34 and 36. The collection tanks 38 and 39 are independent from each other. The mist eliminator 40 is also provided between the two collection tanks 38 and 39 in order to ensure that the condensate mist from the first tank 38 does not enter the second tank 39. The size of each tank is determined by the collection and chemistry needs. This isolates the two regions in order to allow optimization of the removal of targeted pollutants in each section or segment and allow the reaction products and pollutants captured in each region to remain segregated for post-treatment as required.

3. In the segmented design of the present invention, most of the useable heat is recovered in the first heat exchanger stage 34. The first heat exchanger stage can be operated in the condensing mode. The second heat exchanger stage 36 can be operated under subcooled conditions to enhance trace element removal. In the standard IFGT design 10, both heat exchanger stages 12 and 16 are normally used to recover useable heat.

The present invention provides for an improvement in treating flue gas over the standard IFGT design 10 (FIG. 2). The advantages listed below compare the performance of the segmented design of the present invention with a comparable standard IFGT design.

The segmented design of the present invention has the ability to use either an alkali slurry or an alkali solution. For most applications, the alkali slurry, from a reagent cost standpoint, is more economical than using an alkali solution. The present invention offers the user the opportunity to select the most cost effective approach.

For the present invention, the first heat exchanger stage 34, first collection tank 38, and mist eliminator 40 of the segmented unit 30 pretreat the flue gas 3 to improve the operation of the remaining sections. By operating the first heat exchanger stage 34 in the condensible mode and providing a water spray 31 above the first collection tank 38, the pollutant removal efficiency of the system 30 is improved. First, more of the particulates will be collected in the pretreatment region in the segmented design of the present invention than in the standard IFGT design because of water condensation and spray mechanisms. The addition of the gas/slurry contact region 42 in the segmented unit 30 also improves the overall particulate collection efficiency compared to the standard IFGT design.

Second, for the reasons described above, pollutants that are soluble in water, such as HCl and HF, will be removed in the pretreatment region and collected in the first collection tank 38. Because the two collection tanks 38 and 39 are independent from each other, the chlorides and other pollutants and particulates collected in the first collection tank 38 will not contaminate the $SO_2$ collection system 42 or the second stage heat exchanger 36 pollutant removal process. The chemistry for the $SO_2$ scrubber system 42 is more stable and continues to operate efficiently longer and with less attention. The standard IFGT design does not have this capability.

Third, the flue gas 3 entering the gas/slurry contact region 42 of the segmented unit 30 under certain conditions will be at a lower temperature than for the standard IFGT design. This improves the $SO_2$ removal performance of the system 30.

A key advantage is that the present invention allows for isolation, and thus optimization, of the two sections or segments 34 and 36. Each segment 34 and 36 is operated at the best conditions for its intended purpose, whether maximizing heat transfer or removal of air toxics. Isolation of the segments 34 and 36 is accommodated through the mist eliminator 40 or other such device.

The present invention provides more flexibility and can be optimized easier than the standard IFGT design. By decoupling the two heat exchanger stages 34 and 36 in the segmented design, the first heat exchanger stage 34 is optimized for heat recovery, while the second heat exchanger stage 36 can be optimized for pollutant recovery. System optimization is more difficult for the standard IFGT configuration. In the standard IFGT design, both heat exchanger stages 12 and 16 are used for heat recovery and the second stage 16 is also used for pollution removal.

In the present invention, the pretreatment of the flue gas 3 provided by the first heat exchanger 34, first collection tank 38, and the first mist eliminator 40 prevents contaminants such as particulate and chloride from entering the $SO_2$ removal system 42. For all alkali, organic, or buffering agents used as a $SO_2$ reagent, i.e. limestone, lime, amine, magnesium, sodium, etc., pretreatment to remove HCl and HF reduces the reagent requirements and improves the suitability of the products of the $SO_2$ reactions for regeneration or use as a byproduct. Removal of particulate decreases interference of solid or soluble materials on the downstream process.

Although not illustrated, the present invention may include other features. A third heat exchanger stage could be added downstream of the second stage for the purpose of reheating the gas to improve its buoyancy. Additionally, the heat exchangers 34 and 36 can be made of inert materials such as glass, graphite, alloys or coated or covered with inert materials.

The present invention can also be used for achieving $H_2S$ removal. Many reagents can also be used. These include amines, solvents, organics, promoted or buffered reagents, etc. in addition to commonly used reagents such as limestone, sodium alkalis, magnesium alkalis, potassium, amines, magnesium promoted calcium based reagents, and organic acid promoted systems.

Moreover, the second heat exchanger stage 36 of the segmented design 30 can include a refrigeration loop to enhance the removal of heavy metals and other condensible air toxics. If the first two heat exchanger stages are needed to meet heating requirements, a third heat exchanger stage could be added to subcool the flue gas even further. This could be a refrigerant loop.

As mentioned above, sprays 31, 33 and 35 are optional. Generally, one or two are used. Many combinations are possible. For a combination with sprays 33 and 35 used for independent control of emissions, it may be possible to separate the zones such that the spray and condensate from 35 and 36 are captured with a trough or tray to separate this stream from the streams of spray 33.

While specific embodiments of the invention have been shown and described in detail to illustrate the application of the principles of the invention, it will be understood that the invention may be embodied otherwise without departing from such principles.

What is claimed is:

1. A segmented heat exchanger system for treating a flue gas, the system comprising:

a housing having an inlet and an outlet, the flue gas entering the housing through the inlet and exiting the housing through the outlet;

first tubular heat exchanger means in the housing below the inlet for removing heat from the flue gas, the first tubular heat exchanger means having heat exchanger tubes with a corrosion resistant covering, and being constructed and arranged such that the flue gas downwardly in the housing through the first tubular heat exchanger means, the first tubular heat exchanger means operating in a condensing mode for removing both sensible and latent heat from the flue gas;

liquid spray means located in an exit of the first tubular heat exchanger means for assisting in removal of particulate and pollutants from the flue gas passing therethrough, the liquid spray means saturating the flue gas with water;

first collection means in the housing below the first tubular heat exchanger means for collecting liquid and particulate from the flue gas;

first mist elimination means situated in the housing in an exit of the first collection means for removing mist from the flue gas;

reagent slurry spray means positioned in the housing prior to an inlet of a second tubular heat exchanger means for further washing and removing pollutants from the flue gas with an alkali slurry;

second tubular heat exchanger means positioned in the housing prior to the outlet of the housing for condensibly removing pollutants from and being constructed and arranged such that the flue gas, the flue gas passes upwardly in the housing through the second tubular heat exchanger means after passing through the first tubular heat exchanger means, the second tubular heat exchanger means having heat exchanger tubes with a corrosion resistant covering; and second collection means in the housing below the second tubular heat exchanger means and adjacent the first mist elimination means for collecting liquid reacted slurry, alkali slurry and particulate.

2. The system according to claim 1, including a tray in the housing near the reagent slurry spray, means.

3. The system according to claim 1, further comprising first wash means located above the first tubular heat exchanger means for spraying water thereon.

4. The system according to claim 3, further comprising second wash means located above the second tubular heat exchanger means for spraying water thereon.

5. The system according to claim 1, including second mist elimination means situated in the outlet of the housing for removing mist from the flue gas.

* * * * *